(12) United States Patent
Calfee et al.

(10) Patent No.: US 7,274,527 B2
(45) Date of Patent: *Sep. 25, 2007

(54) METHOD FOR OPTIMIZING DYNAMIC STROKE IN THE SELF SERVO-WRITE PROCESS

(75) Inventors: Gary W. Calfee, Santa Clara, CA (US); Richard M. Ehrlich, Saratoga, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 473 days.

This patent is subject to a terminal disclaimer.

(21) Appl. No.: 10/872,062

(22) Filed: Jun. 18, 2004

(65) Prior Publication Data

US 2006/0005403 A1    Jan. 12, 2006

(51) Int. Cl.
*G11B 21/02* (2006.01)
*G11B 5/596* (2006.01)
*G11B 5/09* (2006.01)

(52) U.S. Cl. .................................... 360/75; 360/78.04
(58) Field of Classification Search ...................... None
See application file for complete search history.

(56) References Cited

U.S. PATENT DOCUMENTS

| | | | |
|---|---|---|---|
| 4,354,208 A | 10/1982 | Maury ......................... 360/40 |
| 5,189,571 A * | 2/1993 | Murphy et al. ................ 360/75 |
| 5,862,005 A | 1/1999 | Leis .............................. 360/27 |
| 6,005,725 A * | 12/1999 | Emo et al. ..................... 360/31 |
| 6,069,764 A | 5/2000 | Morris ...................... 360/77.04 |
| 6,304,407 B1 * | 10/2001 | Baker et al. ................... 360/75 |
| 6,633,451 B1 * | 10/2003 | Chainer et al. ............... 360/75 |
| 6,738,205 B1 * | 5/2004 | Moran et al. ................. 360/17 |
| 2005/0275963 A1 * | 12/2005 | Ehrlich ......................... 360/48 |

OTHER PUBLICATIONS

Saito et al., "Optimization of a Magnetic Printing Process by Computer Simulation," in *IEEE Transactions on Magnetics*, vol. 37, No. 4, Jul. 2001, pp. 1389-1392.

Ishida et al., "Demodulation of Servo Tracking Signals Printed with a Lithographically Patterned Master Disk," in *IEEE Transactions on Magnetics*, vol. 37, No. 4, Jul. 2001, pp. 1412-1415.

Ishida et al., "Printed Media Technology for an Effective and Inexpensive Servo Track Writing of HDDs," in *IEEE Transactions on Magnetics*, vol. 37, No. 4, Jul. 2001, pp. 1875-1877.

\* cited by examiner

*Primary Examiner*—William Korzuch
*Assistant Examiner*—Jason Olson
(74) *Attorney, Agent, or Firm*—Fliesler Meyer LLP

(57) ABSTRACT

Methods in accordance with embodiments of the present invention can be applied to determine a width of a data stroke along a rotatable medium of a data storage device. In one embodiment, the width can be determined by measuring a distance from a marker zone edge of a template pattern to a ramp, and measuring a distance from the marker zone edge to an inner crash stop. A track layout can be determined based on the width of the data stroke.

41 Claims, 13 Drawing Sheets

METHOD FOR OPTIMIZING DYNAMIC STROKE IN THE SELF SERVO-WRITE PROCESS

CROSS-REFERENCE TO RELATED PATENT APPLICATIONS

This U.S. patent application incorporates by reference all of the following co-pending applications:

U.S. Pat. No. 7,215,498 entitled "Dynamic Stroke Optimization in the Self Servo-Write Process," by Calfee, et al., filed Jun. 18, 2004.

U.S. Provisional Application No. 60/533,292 entitled "Method for Optimizing Track Spacing Across a Stroke," by Gururangan, et al., filed Dec. 30, 2003.

U.S. Provisional Application No. 60/533,454 entitled "System for Optimizing Track Spacing Across a Stroke," by Gururangan, et al., filed Dec. 30, 2003.

U.S. patent application Ser. No. 10/733,131 entitled "Methods to Determine Gross and Fine Positioning on a Reference Surface of a Media," by Richard M. Ehrlich et al., filed Dec. 10, 2003.

TECHNICAL FIELD

The present invention relates to methods to servowrite media for use in data storage devices, and systems for applying such methods.

BACKGROUND

A hard disk drive typically contains one or more disks clamped to a rotatable spindle motor, at least one head for reading data from and/or writing data to the surfaces of each disk, and an actuator utilizing linear or rotary motion for positioning the head(s) over selected data tracks on the disk(s). The actuator positions the read/write head over the surface of the disk as the spindle motor rotates and spins the disk.

As the head is loaded onto a disk, for example from a ramp, the servo system determines the position of the head on the disk surface by reading servo wedges passing beneath the head. A first track identified by the servo system as the head unloads from the ramp is identified as an acquire track. A first user track can be assigned based on the position of the acquire track, and can define an outer boundary of a data region. The acquire track is some small distance from the ramp, and farther from the outer diameter of the disk than is optimal or desired, wasting otherwise usable space and requiring an increased track density for a given hard disk drive capacity.

BRIEF DESCRIPTION OF THE FIGURES

Details of embodiments of the present invention are explained with the help of the attached drawings in which.

DETAILED DESCRIPTION

Figure 1:
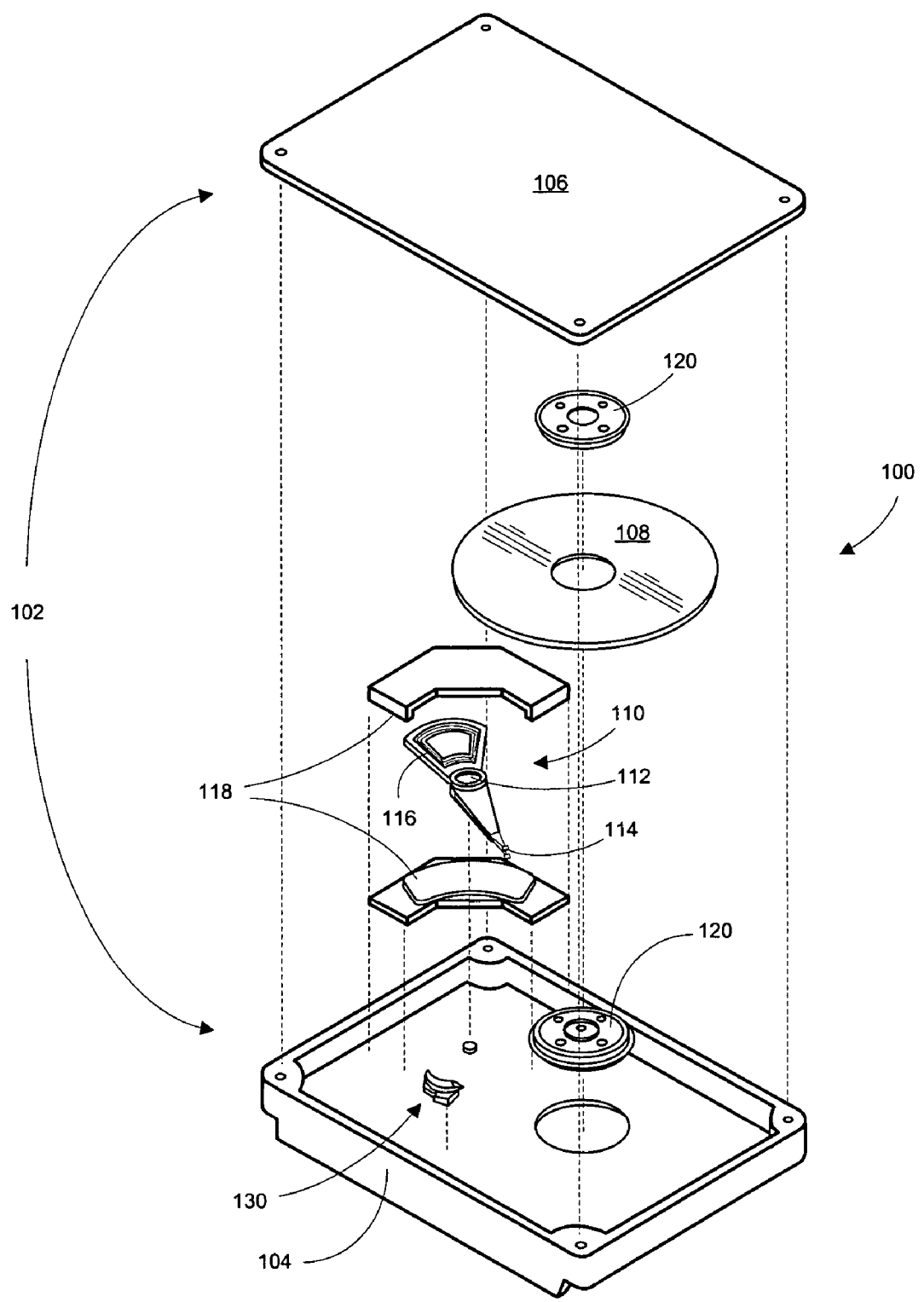
FIG. 1 is an exploded view of an exemplary hard disk drive for applying embodiments of the present invention.

FIG. 1 is an exploded view of an exemplary hard disk drive 100 for applying a method in accordance with one embodiment of the present invention. The hard disk drive 100 includes a housing 102 comprising a housing base 104 and a housing cover 106. The housing base 104 illustrated is a base casting, but in other embodiments a housing base 104 can comprise separate components assembled prior to, or during assembly of the hard disk drive 100. A disk 108 is attached to a rotatable spindle motor 120, for example by clamping, and the spindle motor 120 is connected with the housing base 104. The disk 108 can be made of a light aluminum alloy, ceramic/glass or other suitable substrate, with magnetizable material deposited on one or both sides of the disk 108. The magnetic layer has tiny domains of magnetization for storing data transferred through heads 114. In one embodiment, each head 114 is a magnetic transducer adapted to read data from and write data to the disk 108. The disk 108 can be rotated at a constant or varying rate typically ranging from less than 3,600 to more than 15,000 RPM (speeds of 4,200 and 5,400 RPM are common in hard disk drives designed for mobile devices such as laptop computers). The invention described herein is equally applicable to technologies using other media, as for example, optical media. Further, the invention described herein is equally applicable to devices having any number of disks attached to the spindle motor 120. In other embodiments, the head 114 includes a separate read element and write element. For example, the separate read element can be a magneto-resistive head, also known as a MR head. It will be understood that multiple head 114 configurations can be used.

A rotary actuator 110 is pivotally mounted to the housing base 104 by a bearing 112 and sweeps an arc between an inner diameter (ID) of the disk 108 and a ramp 130 positioned near an outer diameter (OD) of the disk 108. Attached to the housing 104 are upper and lower magnet return plates 118 and at least one magnet that together form the stationary portion of a voice coil motor (VCM). A voice coil 116 is mounted to the rotary actuator 110 and positioned in an air gap of the VCM. The rotary actuator 110 pivots about the bearing 112 when current is passed through the voice coil 116 and pivots in an opposite direction when the current is reversed, allowing for precise positioning of the head 114 along the radius of the disk 108. Each side of a disk 108 can have an associated head 114, and the heads 114 are collectively coupled to the rotary actuator 110 such that the heads 114 pivot in unison. The invention described herein is equally applicable to devices wherein the individual heads separately move some small distance relative to the actuator. This technology is referred to as dual-stage actuation (DSA).

Figure 2:
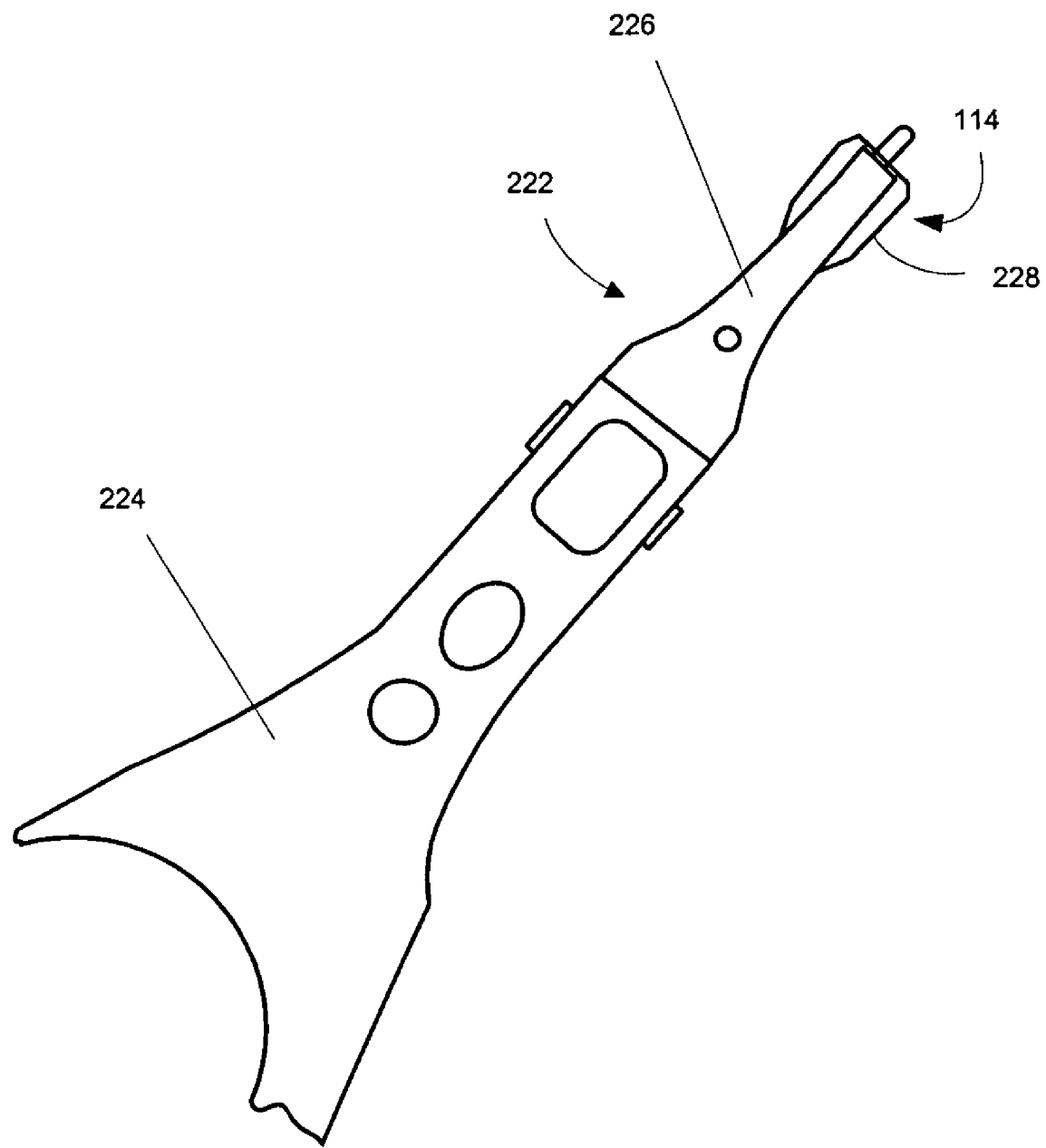
FIG. 2 is a close-up view of a head suspension assembly used in the hard disk drive of FIG. 1, showing head, slider and suspension.

FIG. 2 details an example of a subassembly commonly referred to as a head suspension assembly (HSA) 222 comprising the head 114 formed on a slider 228, which is further connected with a flexible suspension member (a suspension) 226. The suspension 226 can be connected with an arm 224 which in one embodiment can be either integrally formed with a mount for a bearing 112 or separately attached to the mount. The head 114 can be formed on the slider 228 using a number of different techniques, for example the head 114 and slider 228 can be manufactured on a single die using semiconductor processing (e.g. photolithography and reactive ion etching). Spinning of the disk(s) 120 increases air pressure between the slider 228 and the surface of the disk, creating a thin air bearing that lifts the slider 228 (and consequently the head 114) off of the surface of the disk 108. A micro-gap of typically less than one micro-inch can be maintained between the disk 108 and the head 114 in one embodiment. The suspension 226 can be bent or shaped to act as a spring such that a force is applied to the disk 108 surface. The air bearing resists the spring force applied by the suspension 226, and the opposition of the spring force and the air bearing to one another allows the head 114 to trace the surface contour of the rotating disk 108—which is likely to have minute warpage—without "crashing" against the disk 108 surface. When a head 114 "crashes," the head 114 collides with the disk 108 surface such that the head 114 and/or the disk 108 surface may be damaged. As is well understood by those of ordinary skill in the art, not all heads ride an air bearing as described above.

Figure 3:
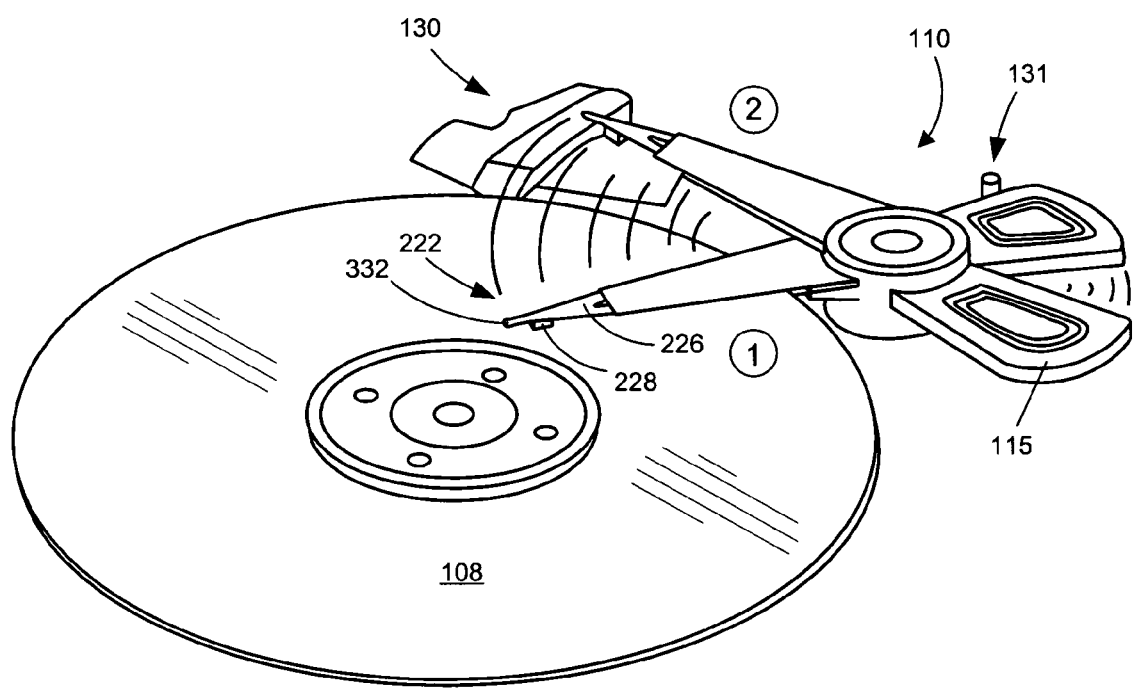
FIG. 3 is a perspective view of the motion of the rotary actuator of FIG. 1 unloading the head from the disk.

Refinements in disk fabrication have enabled manufacturers to produce disks 108 having ultra-smooth surfaces. Electrostatic forces can cause stiction between the slider 228 and the surface. If the speed of rotation of the disk 108 slows such that the air bearing collapses, the slider 228 can contact and stick to the surface of the disk 108, causing catastrophic failure of the hard disk drive 100. Stiction can cause the disk 108 to abruptly lock in position or stiction can cause the slider 228 to forcibly disconnect from the suspension 226. Thus, when the hard disk drive 100 is not in use and before rotation of the disks 108 is slowed and stopped (i.e., the disks 108 are "spun down"), the heads 114 can be removed from close proximity to the disk 108 surface by positioning the suspension 226 on a ramp 130 located either adjacent to the disk 108 or just over the disk 108 surface. FIG. 3 illustrates motion of the actuator 110 as the slider 228 is unloaded from the disk 108 and as the suspension 226 is driven up the ramp 130. The actuator 110 pivots from location 1, where the slider 228 is positioned over the disk 108 surface, to location 2, where the slider 228 is positioned adjacent to the disk 108. The range of motion of the actuator 130 is commonly referred to as a stroke. The stroke can be limited at an inner diameter by an ID crash stop 131. The ID crash stop 131 limits the free travel of the rotary actuator by acting as a physical block to a voice coil holder 115 of the actuator 110. As shown, the ID crash stop 131 is a peg or protrusion which can be associated with the housing. However, in other embodiments the ID crash stop 131 can be arranged in some other fashion, and/or can include some other device for limiting the rotation of the actuator 110. For example, in one embodiment, a tab can extend from the voice coil holder 115 or and can contact a peg or protrusion associated with the housing. One of ordinary skill in the art can appreciate the different ways in which the stroke of the actuator 110 can be blocked or limited.

The slider 228 is removed from close proximity with the disk 108 by pivoting the actuator 110 such that a lift tab 332 extending from the suspension 226 contacts the ramp surface and slides up the ramp 130. The position along the ramp 130 where the lift tab 332 first contacts the ramp 130 can be called the touch-point. As the lift tab 332 slides up the ramp 130 from the touch-point, the ramp 130 opposes the spring force of the suspension 226 and forces the slider 228 (and the head 114) away from the disk 108 surface. The HSA 222 can continue its motion along the stroke by traveling up the grade portion of the ramp 130 to a substantially flat portion that optionally can include a detent for cradling the lift tab 332. The slider 228 can be loaded back onto the disk 120 after the disk spins up to a safe speed. In other embodiments, the suspension 226 contacts the ramp 130 at a location along the suspension 226 between the slider 228 and the pivot point. Unloading the slider 228 from the disk 108 prevents sticking, and reduces a risk of damage from non-operating shock by suspending the slider 228 over a significantly wide gap between the slider 228 and an opposing slider or surface. In still other embodiments in accordance with the present invention, the hard disk drive 100 can include a ramp 130 positioned near the ID, rather than near the OD. In such embodiments, the slider 228 is removed from close proximity with the disk 108 by pivoting the actuator 110 toward the ID such that the lift tab 332 (or suspension 226) contacts the ramp surface and slides up the ramp 130. Such hard disk drives 100 can further include an OD crash stop which can be associated with the housing, and can limit or block a pivoting movement of the actuator 110 at the OD. Methods in accordance with the present invention are equally applicable to such hard disk drives 100 having a ramp 130 positioned near the ID, and optionally an OD crash stop. Systems and methods described below are described with reference to embodiments of hard disk drives 100 having a ramp 130 positioned near the OD and an ID crash stop; however, it will be understood by one of ordinary skill in the art that such embodiments can alternatively include a hard disk drive 100 having a ramp 130 positioned near the ID, and optionally an OD crash stop, and that such embodiments are within the scope of the present invention.

It should be noted, the description herein of the disk surface passing under or beneath the slider is intended to mean that portion of the disk surface that is in close proximity to the slider. It will be understood that when referred to as "beneath" or "under" the slider, the disk surface can be over, or adjacent to the slider in actual physical relation to the slider. Likewise, it will be understood that when referred to as "over" the disk surface, the slider can be beneath, or adjacent to the disk surface in physical relation to the disk surface. By extension, where the slider is beneath the disk surface, the suspension travels down the ramp when the slider is separated from the disk surface.

Figure 4:
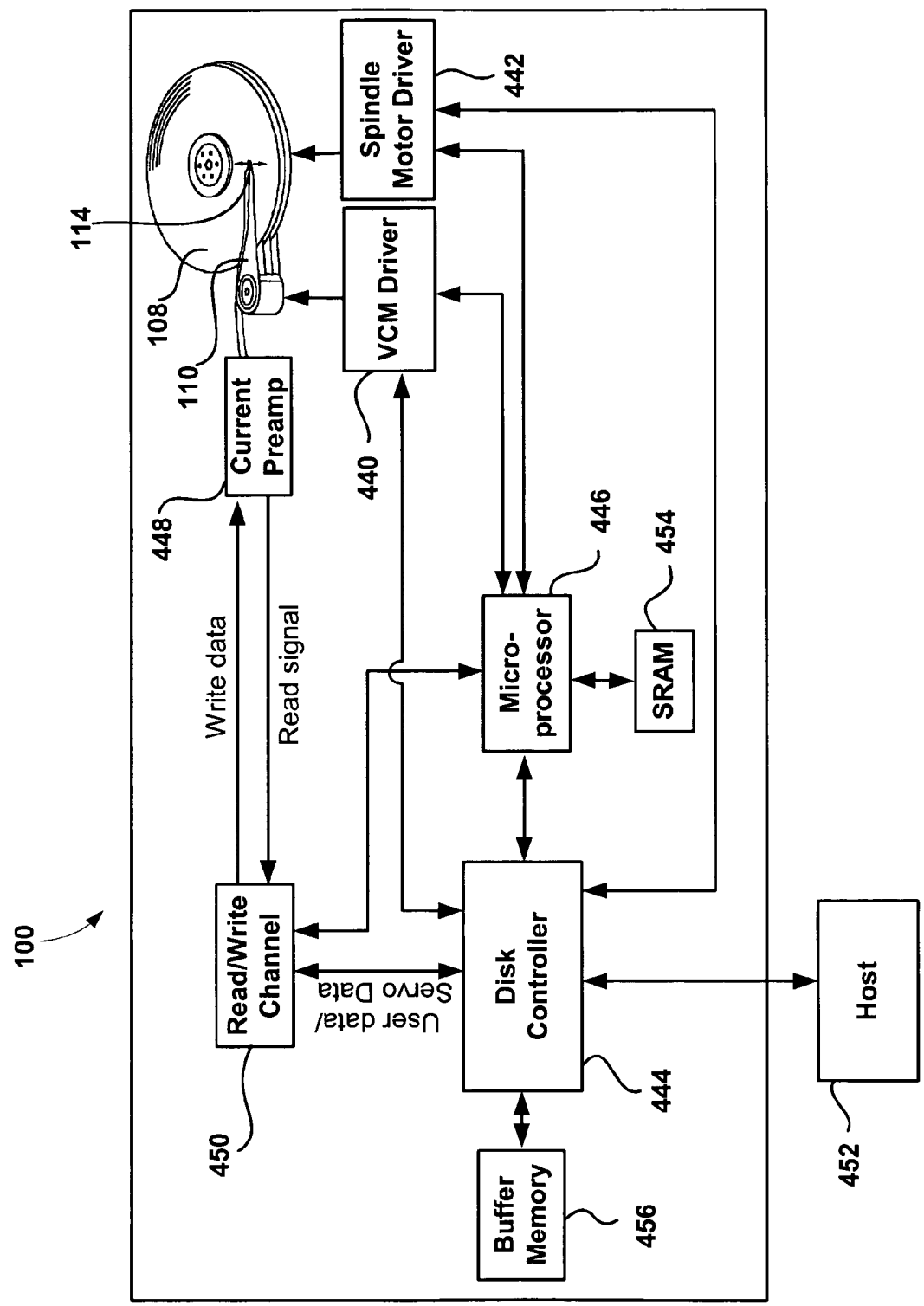
FIG. 4 is a control schematic of a typical hard disk drive for applying a method in accordance with one embodiment of the present invention.

FIG. 4 is a control schematic for the exemplary hard disk drive 100 of FIG. 1. A servo system for positioning the head 114 can comprise a microprocessor 446 and a servo controller, the servo controller existing as circuitry within the hard disk drive 100 or as an algorithm resident in the microprocessor 446, or as a combination thereof. In other embodiments, an independent servo controller can be used. The servo system uses positioning data read by the head 114 from the disk 108 to determine the position of the head 114 over the disk 108. When the servo system receives a command to position a head 114 over a track, the servo system determines an appropriate current to drive through the voice coil 116 and commands a VCM driver 440 electrically connected with the voice coil 116 to drive the current. The servo system can further include a spindle motor driver 442 to drive current through the spindle motor 120 and rotate the disk(s) 108, and a disk controller 444 for receiving information from a host 452 and for controlling multiple disk functions. The host 452 can be any device, apparatus, or system capable of utilizing the hard disk drive 100, such as a personal computer, Web server, or consumer electronics device. An interface controller can be included for communicating with the host 452, or the interface controller can be included in the disk controller 444. In other embodiments, the servo controller, VCM driver 440, and spindle motor driver 442 can be integrated into a single application specific integrated circuit (ASIC). One of ordinary skill in the art can appreciate the different means for controlling the spindle motor 120 and the VCM.

A flexible circuit (not shown) is connected with the rotary actuator 110 to supply current to the voice coil 116 and to provide electrical connections to the heads 114, allowing write signals to be provided to each head 114 and allowing electrical signals generated during reading to be delivered to pre-amplification circuitry (pre-amp) 448. Typically, the flexible circuit comprises a polyimide film carrying conductive circuit traces connected at a stationary end with the lower housing 104 and at a moving end to the rotary actuator 110. The disk controller 444 provides user data to a read/write channel 450, which sends signals to the pre-amp 448 to be written to the disk(s) 108. The disk controller 444 can also send servo signals to the microprocessor 446, or the disk controller 444 can control the VCM and spindle motor drivers directly, for example where multi-rate control is used. The disk controller 444 can include a memory controller for interfacing with buffer memory 456. In one embodiment, the buffer memory 456 can be dynamic random access memory (DRAM). The microprocessor 446 can include integrated memory (such as cache memory), or the microprocessor 446 can be electrically connected with external memory (for example, static random access memory (SRAM) 454 or alternatively DRAM).

When a slider is loaded onto a disk from a ramp, the servo system must determine the position of the head along the stroke. The HSA is unstable when the slider is initially loaded due to suction forces and the transition from the graded ramp to the disk. Once the slider stabilizes and an air bearing is established between the disk and the slider, the head 114 can determine its position on the disk by reading servo wedges passing beneath the head 114. After some criteria is met—e.g., the track is measured on a predefined number of consecutive servo wedges—the head locks onto a track. The track on which the head locks is called an acquire track.

Figure 5:
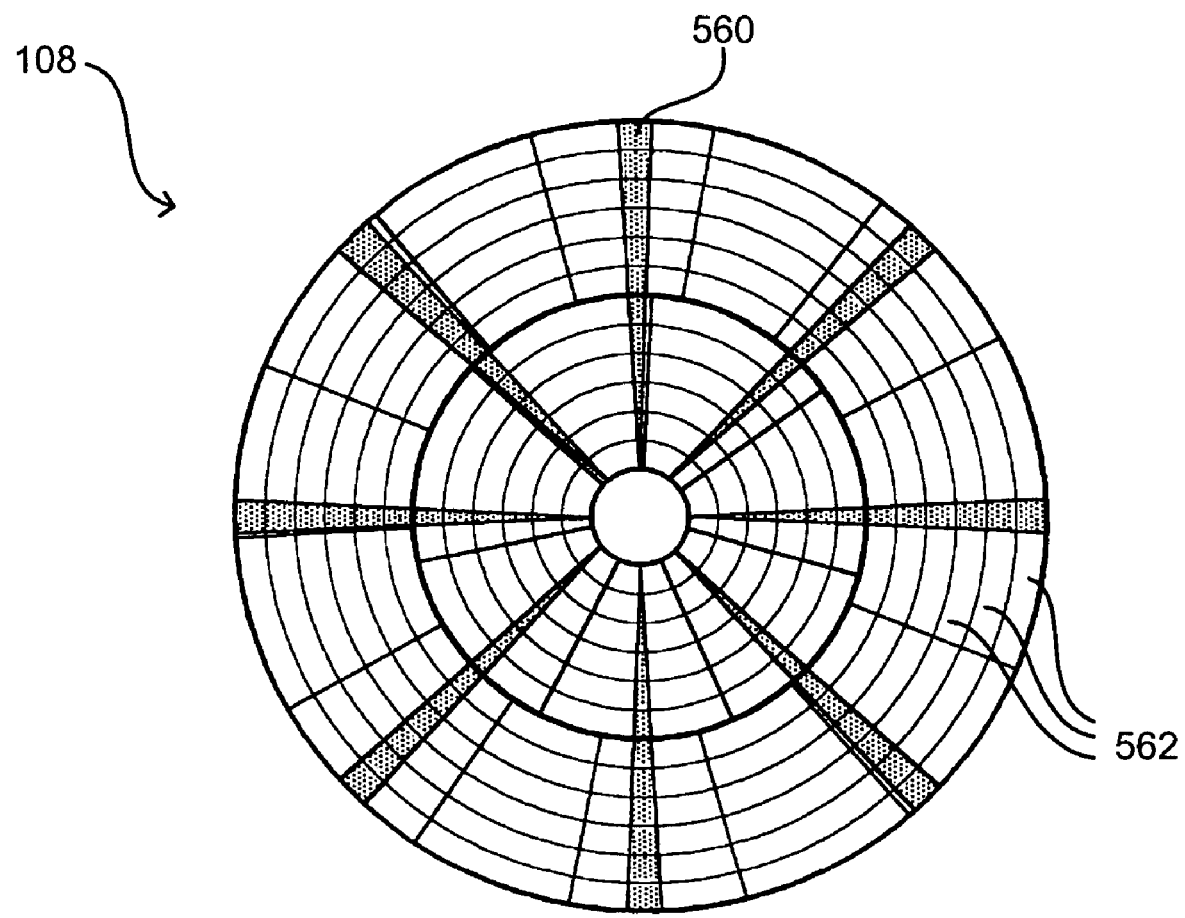
FIG. 5 is a diagram showing an example of a data and servo format for a disk in the drive of FIG. 1.

The information stored on such a disk can be written in concentric tracks, extending from near the ID to near the OD, as shown in the exemplary disk of FIG. 5. In an embedded servo-type system, servo information can be written in servo wedges 560, and can be recorded on tracks 562 that can also contain data. Data tracks written to the disk surface can be formatted in radial zones. Radial zones radiating outward from the ID can be written at progressively increased data frequencies to take advantage of an increase in linear velocity of the disk surface directly under a head in the respective radial zones. Increasing the data frequencies increases the data stored on the disk surface over a disk formatted at a fixed frequency limited at the ID by a circumference of a track at the ID. In a system where the actuator arm rotates about a pivot point such as a bearing, the servo wedges may not extend linearly from the ID to the OD, but may be curved slightly in order to adjust for the trajectory of the head as it sweeps across the disk.

Figure 6:
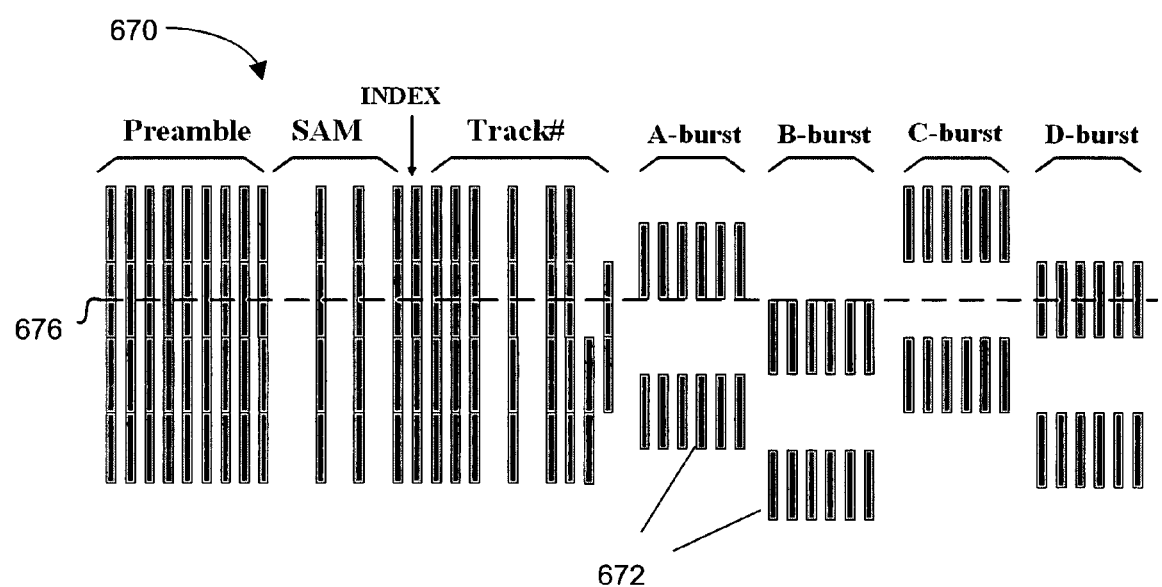
FIG. 6 is a partial detailed view of a disk from the hard disk drive shown in FIG. 1 having a final servo pattern.

FIG. 6 illustrates a portion of a servo pattern 670 within a servo wedge 560. The servo pattern 670 includes information stored as regions of magnetization. For example, where the servo pattern 670 is longitudinally magnetized, grey blocks are magnetized to the left and white spaces are magnetized to the right, or vice-versa. Alternatively, where the servo pattern 670 is perpendicularly magnetized, grey blocks are magnetized up and white spaces are magnetized down, or vice-versa. In other embodiments, information can be stored as indicia other than regions of magnetization (e.g., optical indicia). Servo patterns 670 contained in each servo wedge are read by the head as the surface of the spinning disk passes under the head. The servo patterns 670 can include information identifying a data field. For example, the servo pattern 670 can include a servo address mark (SAM), track identification, an index, etc. The exemplary final servo pattern is a simplification of a typical servo pattern. The servo information can be arranged in any order, and can include many more transition pairs than are illustrated (for example, the region containing track identification is truncated as shown, and commonly includes many more transition pairs than are illustrated). Further, additional information, such as partial or complete wedge number information, can be included in the final servo pattern. One of ordinary skill in the art can appreciate the myriad different arrangements of information that can be contained in a servo pattern. Systems and method in accordance with embodiments of the present invention should not be construed as being limited in scope to those examples provided herein.

Servo information often includes transition pairs called "servo bursts." The servo bursts 672 can be positioned regularly about each track, such that when a data head reads the servo bursts 672, a relative position of the head can be determined that can be used to adjust the position of the head relative to the track. For each servo wedge, this relative position can be determined, in one example, as a function of the target location, a track number read from the servo wedge, and the amplitudes or phases of the bursts 672, or a subset of those bursts 672. The position of a head or element, relative to the center of a target track, will be referred to herein as a position-error signal (PES).

For example, a centerline 676 for a given data track can be "defined" relative to a series of bursts, burst edges, or burst boundaries, such as a burst boundary defined by the lower edge of A-burst and the upper edge of B-burst. The centerline 676 can also be defined by, or offset relative to, any function or combination of bursts or burst patterns. This can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline 676 is approximately equal in amplitude to the portion coming from the B-burst below the centerline 676. The resulting computed PES can be zero if the radial location defined by the A-burst/B-burst (A/B) combination, or A/B boundary, is the center of a data track, or a track centerline 676. In such an embodiment, the radial location at which the PES value is zero can be referred to as a null-point. Null-points can be used in each servo wedge to define a relative position of a track. If the head is too far towards the outer diameter of the disk, or above the centerline, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk.

The PES scheme described above is one of many possible schemes for combining the track number read from a servo wedge and the phases or amplitudes of the servo bursts. For example, U.S. Pat. No. 5,381,281 to Shrinkle et al. describes a PES scheme including a quad-servo burst pattern having first, second, third, and fourth servo bursts distributed in a series along the length of a portion of the data sector such that the center point of each servo burst is offset from adjacent bursts by a radial distance equivalent to one-half of the data track width. A quadrature-based track following algorithm applying a difference of sums of servo burst pair read voltages can minimize track following errors where servo bursts are mispositioned relative to one another. Such a scheme can benefit from embodiments of the present invention, as can many other track following schemes. The schemes described above are only a few of many possible schemes for positioning the head. Hard disk drives using most (if not all) possible PES schemes could benefit from the invention contained herein.

Servo patterns can be written to the disks prior to assembly of the hard disk drive 100 using a media writer. A stack of disks is loaded onto the media writer and servo patterns are carefully written onto the surface of each disk, a time consuming and costly process. Alternatively, a commonly less time-consuming and less expensive method can include writing servo patterns or template patterns on a reference surface of a single blank disk to be used as a reference for self-servo writing unwritten (and written) surfaces of one or more disks of an assembled hard disk drive. In one such self-servo writing method, called printed-media self-servo writing (PM-SSW), a coarse magnetic template pattern can be transferred to a single disk surface (a reference surface) by magnetic printing. A magnetic printing station can be used to magnetically print or otherwise transfer a template pattern using a known transfer technique. One such transfer technique is described in "Printed Media Technology for an Effective and Inexpensive Servo Track Writing of HDDs" by Ishida, et al. *IEEE Transactions on Magnetics*, Vol. 37, No. 4, July 2001. A blank disk (the reference surface) is DC erased along the circumferential direction of the disk by rotating a permanent magnet block on the disk surface. A template, or "master", disk is then aligned with the blank disk and the two disks are securely faced with each other by evacuating the air between the two disk surfaces through a center hole in the blank disk. An external DC field is applied again in the same manner as in the DC erasing process, but with an opposite polarity. A number of different transfer techniques exist, and one of ordinary skill in the art can appreciate the different methods for transferring a template pattern to a reference surface.

Figure 7:
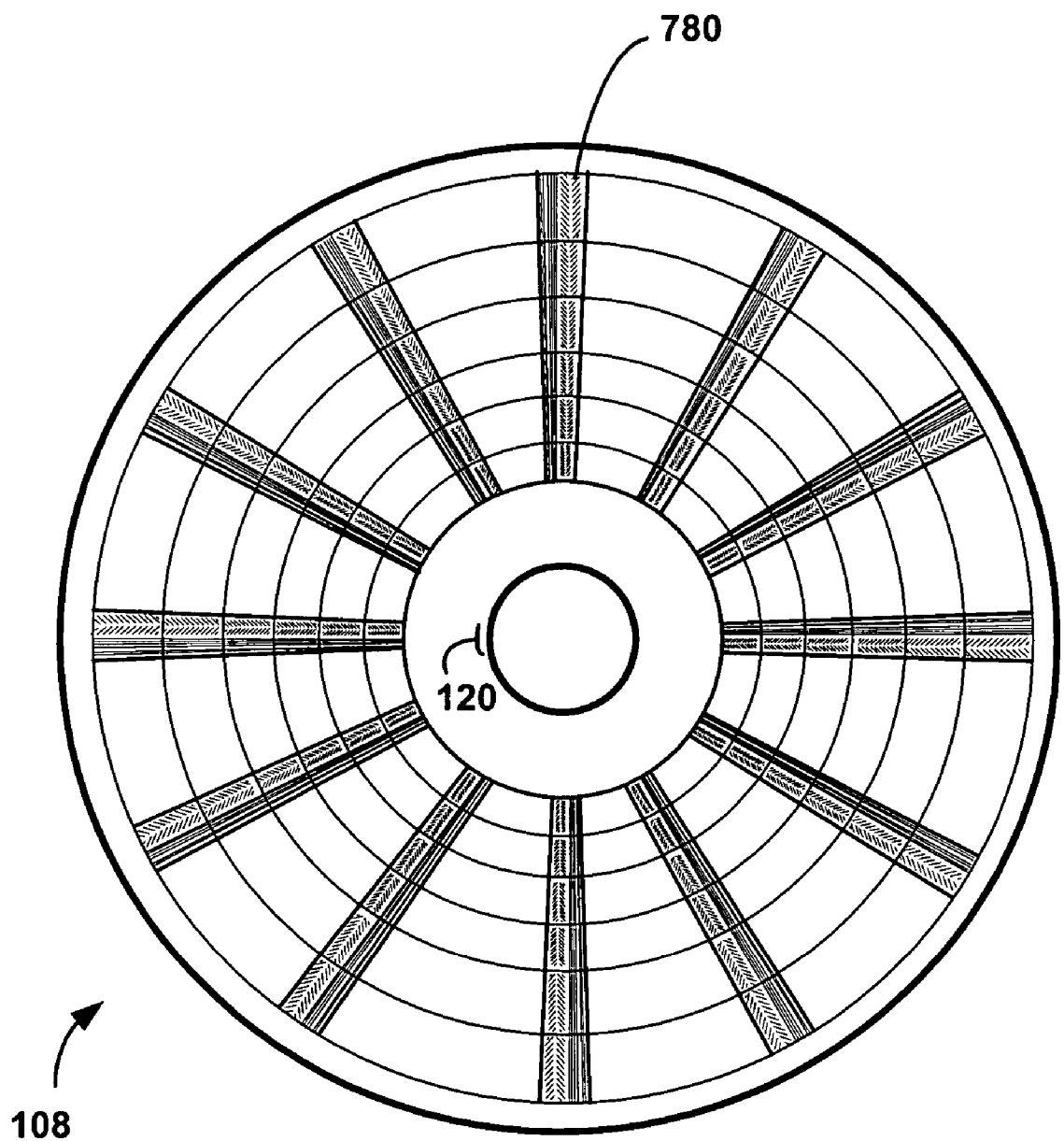
FIG. 7 is an illustration of a reference surface of a disk having a template pattern.

FIG. 7 illustrates a reference surface having a magnetically printed template pattern 780 usable for PM-SSW. The template pattern 780 can comprise clocking and, optionally, radial position information. The template pattern 780 can be divided into a number of pattern wedges equivalent to the number of servo wedges 560 intended for the final servo pattern 670, and printed such that the pattern wedges 560 trace an arc approximately matching the arcing sweep of the head 114 from the ID to the OD as described above. In other embodiments, the template pattern 780 can have fewer or more pattern wedges than intended servo wedges 560. Further, the pattern wedges need not be printed having arc.

A completed and enclosed hard disk drive can be assembled with at least one disk 108 having a reference surface, and optionally one or more blank disks. The template pattern 780 is applied by the hard disk drive electronics to self-write highly resolved product embedded servo patterns 670 onto storage surfaces of each disk 108, including the reference surface having the template pattern 780. When the at least one disk 108 is removed from a magnetic printing station and connected with a spindle 120, a shift typically occurs between the axis of rotation and the center of tracks of the template pattern 780. The shift is attributable to machining tolerances of the spindle and magnetic printing station, as well as other variables. The track followed by the head 114 can be displaced laterally in a sinusoidal fashion relative to the head 114 as the disk 108 rotates. This sinusoidal displacement is typically referred to as eccentricity. Firmware executed by the hard disk drive 100 and the hard disk drive electronics enable the head 114 positioned over the reference surface to follow and read the template pattern 780 and enable each of the heads 114 to write precise final servo patterns 670 on each of the respective surfaces of each disk 108. The hard disk drive 100 can compensate for eccentricity, writing tracks that are nominally concentric with the center of rotation of the spindle, or alternatively, having some built-in eccentricity as defined by the firmware, for example. A final servo pattern 670 can be written to the reference surface in any sequence, i.e. prior to, subsequent to, or contemporaneously with writing final servo patterns on some or all of the other surfaces. The final servo patterns can be written contemporaneously to reduce servo write times, and the final servo patterns 670 can be written between pattern wedges of the template pattern 780. The template pattern 780 is overwritten either during the self-servo writing process or by user data. For example during hard disk drive 100 testing data is written to the data fields and read back to test the data fields.

Figure 8:
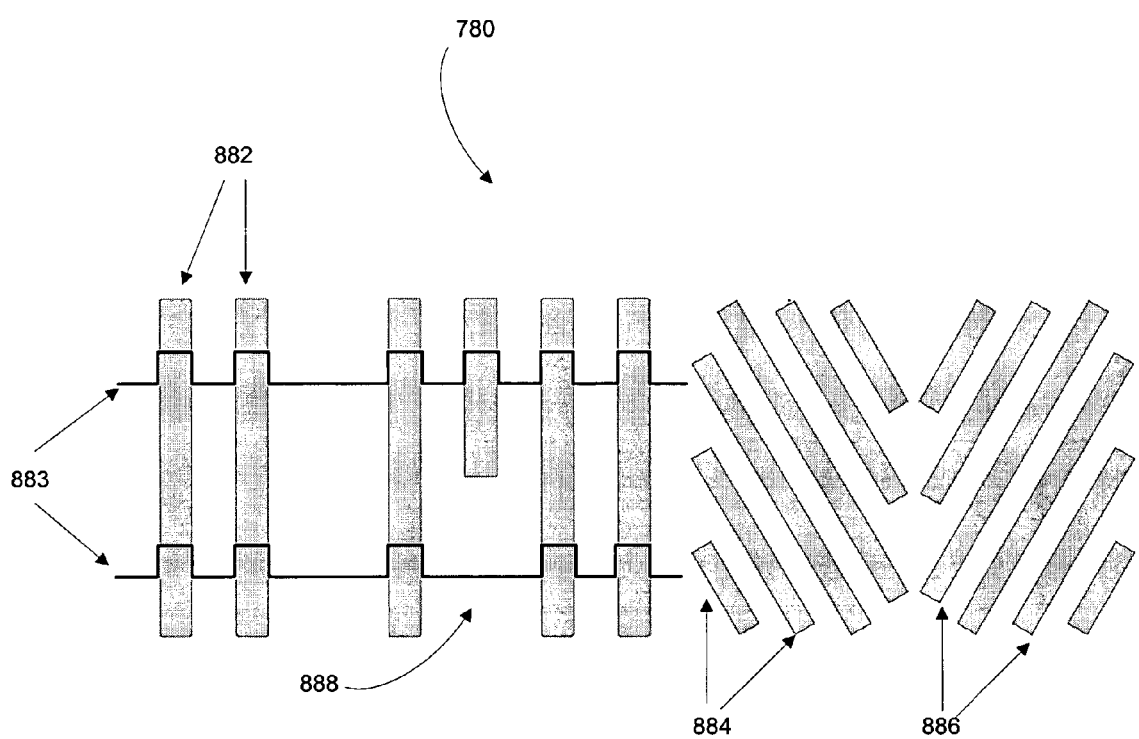
FIG. 8 illustrates a portion of FIG. 7 including a portion of a marker-zone in accordance with one embodiment of the present invention.

FIG. 8 illustrates a template pattern 780 including pairs of pulses 882, and chevrons ("zig-bursts" 884 and "zag-bursts" 886). The pulse pairs 882 provide timing information for writing servo patterns. For example, the pulse pairs 882 can describe a crude SAM or an index mark. The chevrons 884,886 are incorporated into the template pattern 780 to help identify radial positioning. As shown, the zig-bursts 884 incorporate a positive chevron angle relative to the radial line, and the zag-bursts 886 incorporate a negative chevron angle relative to the radial line. In other embodiments of the template pattern 780, the chevrons 884,886 can be inverted such that the zig-bursts 884 incorporate a negative chevron angle relative to the radial line, and the zag-bursts 886 incorporate a positive chevron angle relative to the radial line (such that the bursts shown in FIG. 8 form upside down "V"'s). A radial distance between two chevrons can be referred to as a chevron cycle. A portion of the chevron cycle passing beneath the head 114 is converted into radial positioning information. Each chevron cycle provides positioning information along the width of the chevron cycle $w_c$, and cannot communicate absolute radial position. The pulse pairs 882 can be multiple, and as shown include six pulse pairs. In one embodiment, one or more of the pulse pairs 882 can be used as a marker-zone for gross positioning. For example, the fourth transition-pair (or "di-bit"—a combination of an up and a down) from left to right is written so that the di-bit abruptly disappears at some radius from the center of the disk 108. At a radius closer to the center of the disk 108, the di-bit can abruptly reappear so that the pulse pair 888 is continued. The interruption in the radial continuity of the magnetized pulse pair 888 can be any length. For example, in one embodiment the interruption can be 200 μm, while in other embodiments the switch in magnetization can occur once such that a single marker-zone edge can be encountered by the head 114 as in travels radially along the stroke.

Traces 883 overlay the pulse pairs 882 in FIG. 8, and represent signals detected by the head 114 in the digital portion at different radial positions along the stroke as the disk 108 passes beneath the head 114. Where the head 114 traverses all six pulse pairs 882, for example the top portion of the pulse pairs 882 as illustrated, the digital detection circuitry detects a di-bit. Where the head 114 traverses five of the pulse pairs 882, for example along the bottom portion of the pulse pairs 882 as illustrated, the digital circuitry detects a missing di-bit. Where the head 114 straddles a marker-zone edge, moving radially from the pulse pair 882 to the marker-zone the probability of detecting the di-bit slowly decreases. Where the head 114 equally straddles the transition in the digital pattern, the probability of detecting the di-bit is roughly 50%. The template pattern, as shown in FIG. 8 and described in detail above, is encoded using di-bit encoding. However, it should be noted that the template pattern can be encoded using any of several possible schemes. For example, template patterns for use in methods and systems in accordance with embodiments of the present invention can be encoded using wide bi-phase digital encoding (also referred to herein as Manchester encoding). Wide bi-phase digital encoding is described in greater detail in U.S. Pat. No. 5,862,005 to Leis, et al., incorporated herein by reference. One of ordinary skill in the art can appreciate the different schemes for encoding a template pattern on a reference surface.

Most commonly-used servo demodulation systems determine the digital content of a servo wedge signal by detecting either the presence or absence of filtered signal pulses at specified times or by detecting the value of the filtered signal at specified times. The signal can be filtered through a low-pass filter, a high-pass filter, or a combination of the two (i.e., a band-pass filter). The amplitude of the filtered signal can be calculated and compared to a threshold. The threshold can vary with an average amplitude of the filtered signal in the vicinity. The location along the stroke where the amplitude no longer exceeds the threshold can be used as a crude position signal indicating a marker-zone edge. A radial position of the head 114 can be known within a distance that is smaller than the size of the read width of the head 114 by detecting the marker-zone edge. The read width of the head 114 is much smaller than the width of the chevron cycle $w_c$. For example, in one embodiment the width of the chevron cycle is 3 μm. The width of the read head 114 is a small fraction of a micron. Therefore, the chevrons can provide fractional positioning of the head 114 relative to the gross positioning provided by the marker-zone edge.

A chevron cycle located at the same radial position as the marker-zone edge can be assigned a designated cycle count from which the head 114 can determine radial positioning along the stroke by the cycle count of the chevron over which the head 114 passes relative to the marker zone edge. If the position of the head 114 is lost, the head 114 can locate the marker-zone edge and the radial position is known to be the designated cycle count. For example, if the designated cycle count is 1000, the radial position of the marker-zone edge is chevron cycle count 1000 (plus a fractional cycle count based on whatever fractional position is measured from the actual chevron angle). Use of this scheme can present a problem if the location of the marker-zone edge nearly coincides with an exact integer chevron cycle count. If one of the chevrons (either the zig-burst 884 or the zag-burst 886) has a phase of very nearly zero degrees at the edge of the marker-zone, then it can be difficult to decide whether to set the integer portion of the chevron cycle count to the designated cycle count or one count less than the designated cycle count. Using the example discussed above, the designated cycle count for the zig-burst 884 at the marker-zone edge is 1000, while the corresponding designated cycle count for the zag-burst 886 is −1000. If the measured phase of the zig-burst 884 at the marker-zone edge is very near zero degrees, for the servo wedge at which the chevron cycle counts are altered to account for the known location of the head 114, where the measured phase of the fractional cycle count is slightly more than zero degrees (i.e., a small positive phase) the integer portion of the zig-burst 884 cycle count can be set to 1000, while where the measured phase of the fractional cycle count is slightly less than 360 degrees (i.e., a small negative phase) the integer portion of the zig-burst 884 cycle count can be set to 999. Thus, a phase of a fractional cycle count near zero degrees (but slightly greater) will result in a total zig-burst 884 cycle count that is slightly greater than 1000, while a phase of a fractional cycle count near to 360 degrees (but slightly less) will result in a total zig-burst 884 cycle count that is slightly less than 1000. The same reasoning can be applied to determine the integer portion of the zag-burst 886 cycle count at the time that both the zig-burst 884 and zag-burst 886 cycle counts are altered to account for the known location of the head 114.

The marker-zone can be positioned anywhere along the stroke. In one embodiment, the marker-zone can be positioned centrally along the data stroke (wherein the data stroke is that portion of the stroke traversing data tracks), bisecting the data stroke and minimizing the maximum distance from any location on the disk to the marker-zone, thereby improving nominal recovery time where the head 114 slips chevron cycles. In other embodiments, the marker-zone can span a defined distance and have a first edge, for example, near the OD and a second edge near the ID. One of ordinary skill in the art can appreciate the myriad different arrangements of the marker-zone on the disk.

Figure 9:
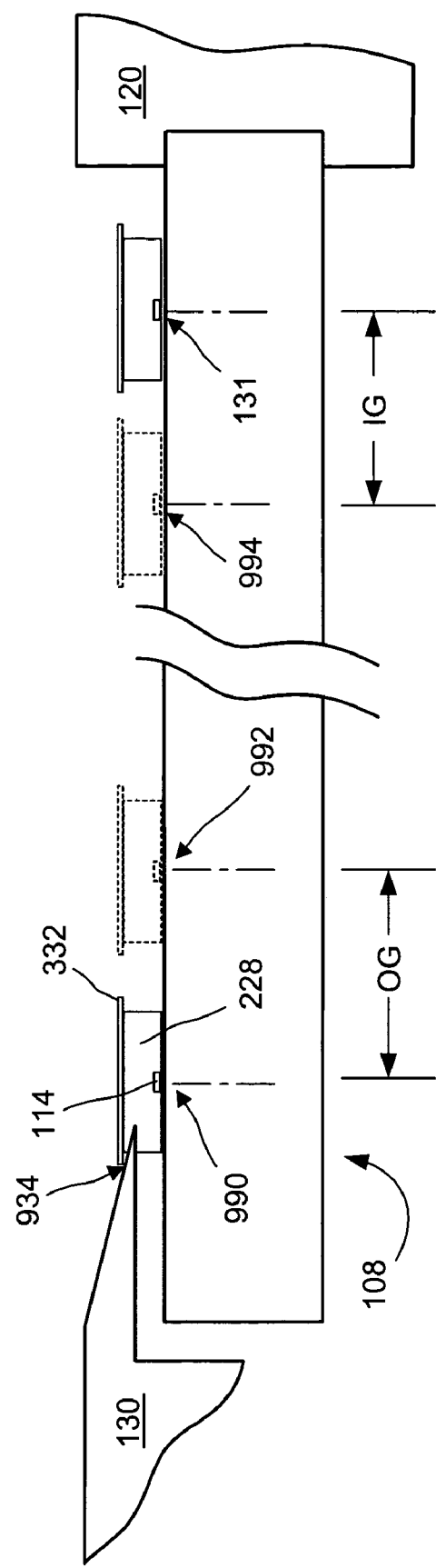
FIG. 9 is a side view of the head suspension assembly as the head is loaded onto the disk from the ramp.

Referring to FIG. 9, as a slider 228 is loaded onto a disk 108 from a ramp 130, the slider 228 can contact the disk 108 surface. Contact can cause damage to one or both of the disk 108 surface and the slider 228. Such damage can interfere with the ability of a head connected with the slider to read from or write data to the disk. For example, debris or damage on the disk surface can alter the surface so that an air gap formed between the slider and the surface is non-uniform, causing instability or an air gap height that results in a weakened measured or written signal. A first user track 992 typically (though not necessarily) contains critical system information and can be assigned to a track located some distance closer to the ID than the average acquire track. The distance between the first user track 992 and the average acquire track 990 is an outer guard band OG that acts as a buffer so that the head 114 can avoid reading or writing to the disk 108 while traversing a portion of the disk 108 surface possibly damaged by sporadic contact during frequent loading of the slider 228 from the ramp 130 to the disk 108. The average acquire track 990 estimates the location of the touch-point 934 of the lift tab 332 for purposes of setting the first user track 992. Ideally, the touch-point 934 is positioned in close proximity to the average acquire track 990 so that a maximum amount of the stroke is usable for storing user data. However, more likely the acquire track 990 is some small distance from the ramp 130, and farther from the OD than is optimal or desired. Therefore, the buffer is likely farther from the OD than is necessary, to avoid defects.

The data stroke traverses a portion of the disk surface between the first user track 992 and a final user track 994 offset from the ID crash stop 131 by an inner guard band IG. In low-cost designs, the mechanical tolerance of the ID crash stop 131 location and the touch-point 934 location is a significant portion of the data stroke. The location of the average acquire track 990 from the touch-point 934 includes a tolerance that can vary with the criteria for assigning an average acquire track 990; therefore, setting the first user track 992 based on the average acquire track 990 can further reduce the width of the data stroke (and increase the variability). Further, the first user track 992 is typically assigned to a track that is a conservative distance from the average acquire track 990. Typically, a manufacturer will increase the density of the tracks written to the disk 108 surface to produce a hard disk drive 100 having a targeted capacity. An increase in track density can negatively impact hard disk drive 100 performance, resulting, for example, in a reduction in manufacturing tolerance for the width of the head 114, or a degradation in the performance of the servo system.

Figure 10A:
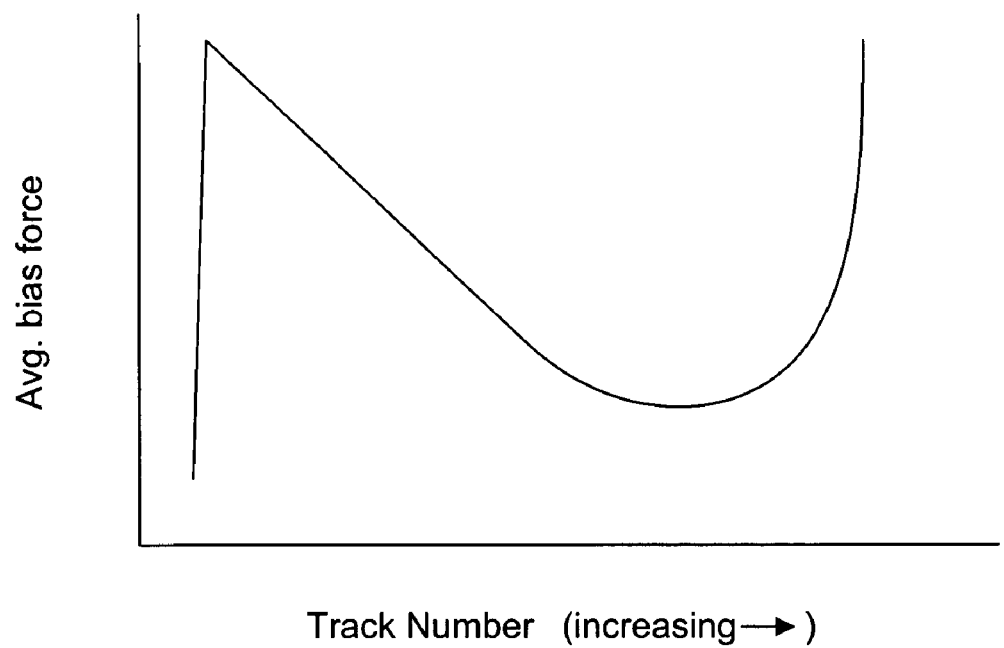
FIG. 10A is an exemplary plot of a measurement of average bias force as a function of track number.

The touch-point 934 can be more accurately located for defining a first-user track 992 by detecting a dramatic change in an average bias force as the actuator 110 contacts the ramp 130. Electrical bias forces can result from voltage and current offsets in the electrical circuitry and can act on a rotary actuator 110 as a function of the radial position of the head 114 on the disk 108. An average bias force can be measured by the servo system as the head 114 reads servo wedges passing beneath the head 114. The servo system can seek the OD and measure the average control effort (i.e. bias force) required as the head 114 changes radial position. FIG. 10A is a sample plot of average bias force as a function of track number, where the origin represents the OD (rather than a first user track) and an increase in track number indicates nearness to the ID. As the head 114 is pivoted toward the OD from the ID (moving from right to left on the plot), the average bias force initially drops, and then gradually and steadily increases. Where the lift tab 332 contacts the ramp 130, a dramatic drop in average bias force can be measured. In other embodiments, the bias force can increase, rather than decrease. The measured bias is a function of the sum of multiple variables (e.g., flex circuit spring force, windage, etc.), and the multiple variables can be affected by hard disk drive component geometry, disk spin speed, etc. Therefore, the sum of the multiple variables can increase in some embodiments.

Figure 10B:
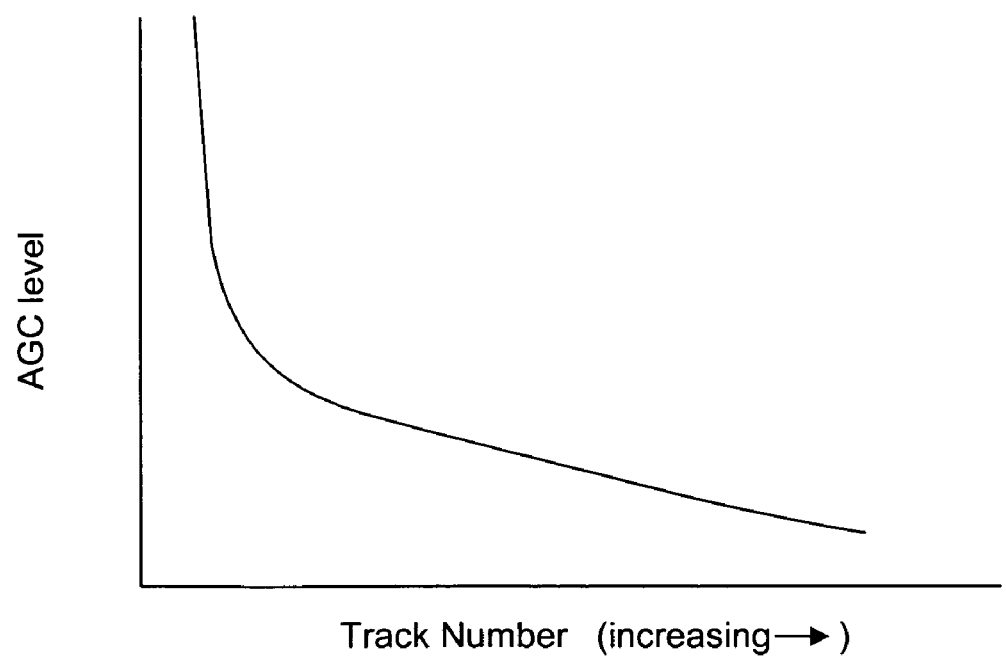
FIG. 10B is an exemplary plot of a measurement of automatic gain control value as a function of track number.

Alternatively, the touch-point 934 can be located by detecting a dramatic change in a level of gain adjustment in an automatic gain control (AGC) circuit associated with the read/write channel 450. The AGC circuit adjusts the amplitude of a signal received from the current preamplifier 448 within desirable boundaries when converting an analog signal into digital form. FIG. 10B is a sample plot of AGC level as a function of track number, where the origin represents the OD (rather than a first user track) and an increase in track number indicates nearness to the ID. As the head 114 is pivoted toward the OD from the ID (moving from right to left on the plot), the AGC level increases. The sharp rise in AGC level corresponds roughly to a contact point between the lift tab 332 and the ramp 130, and can be attributed, at least in part, to loading force on the slider 228. As the lift tab 332 contacts the ramp 130, the lift tab 332 is raised and lifts the suspension 226, which applies a smaller loading force on the slider 228, which consequently flies higher to re-balance the reduced suspension loading with the air-bearing force.

As described above, data tracks written to the disk surface can be formatted in radial zones. For example, the servo pattern of FIG. 5 includes two radial zones, a first radial zone extending from the ID to approximately the middle of the data stroke, and a second radial zone extending from the first radial zone to the OD and having a data frequency greater than the data frequency of the first radial zone. In other embodiments, a servo pattern in accordance with the present invention can include more radial zones. For example, in some embodiments the servo pattern can have twenty or more radial zones. The radial positions of these zones are preferably tightly controlled to maximize the robustness of the data format. Thus, the mechanical tolerances of the ID crash stop and ramp affect the layout of the final servo pattern relative to a fixed radial zone position. For example, where the data frequency of the second radial zone is 1.5× the data frequency of the first radial zone, a shift in the position of the first user track can affect the data storage capacity of the disk approximately 1.5× as much as a shift in the position of the final user track.

A method in accordance with one embodiment of the present invention can include determining a final servo pattern to be written to one or more surfaces of a disk during a self-servo write process. The method can be applied to a reference surface having a template pattern, for example as shown in FIGS. 7 and 8. The position of a ramp relative to a marker zone, and the location of the ID crash stop relative to the marker zone can be found and applied to maximize a data stroke for a given guard band while maintaining superior absolute radial data zone placement. The template pattern can be printed to a reference surface, written to the reference surface by a media writer, or otherwise transferred to the reference surface, and can include determining a marker zone located at a known radial position.

Figure 11:
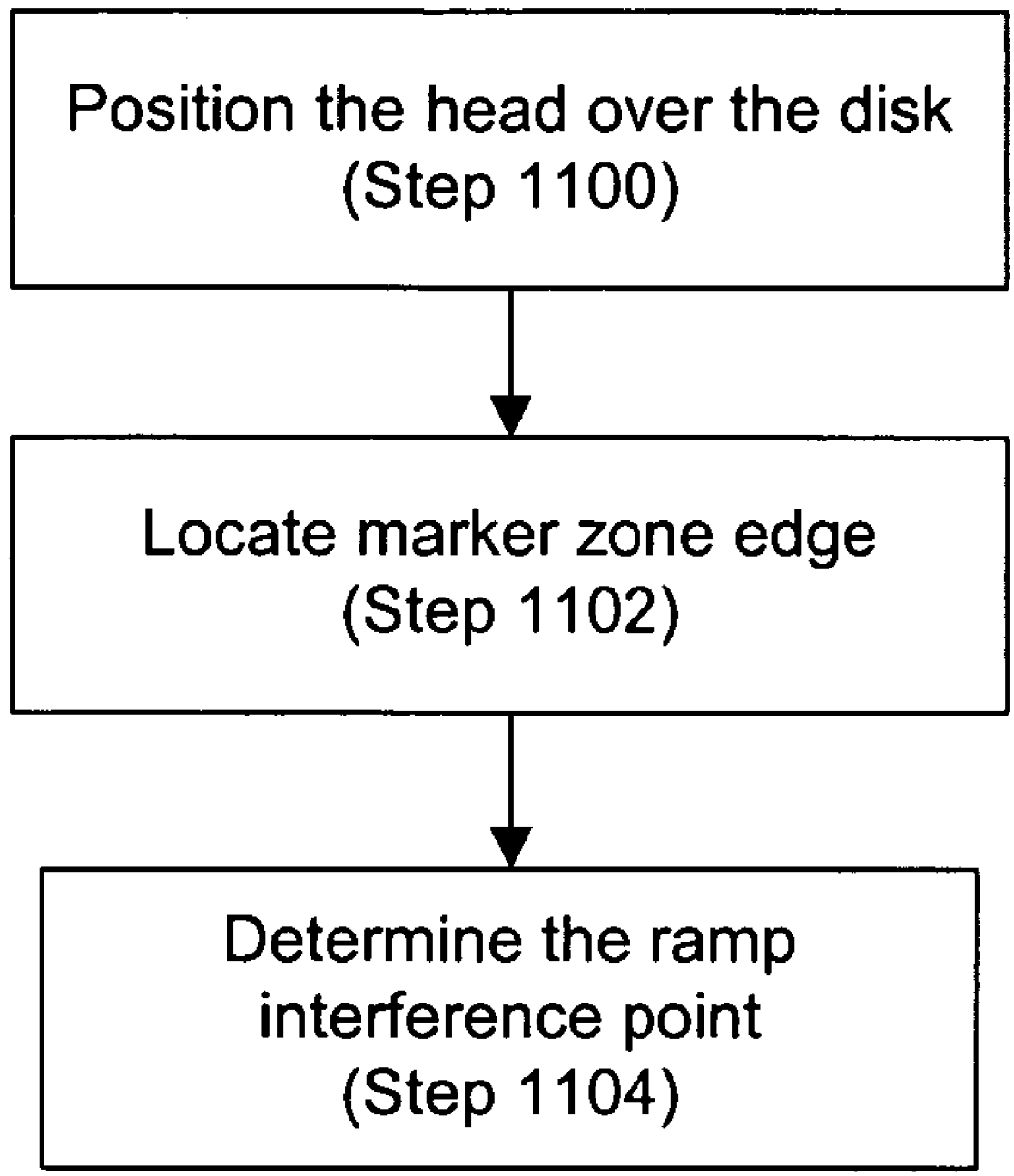
FIG. 11 is a flowchart of a method in accordance with one embodiment of the present invention to determine the position of a ramp relative to an actuator.

Referring to the flowchart of FIG. 11, if the HSA is positioned on the ramp, the slider can be positioned over the reference surface of the disk by loading the HSA from the ramp to the disk (Step 1100). Once the slider is positioned over the surface, a radial reference position of one or more of the pattern wedges is located as described above, by detecting a marker zone edge of the template pattern (Step 1102). Once the marker zone edge is located, the position of the ramp can be determined by pivoting the rotary actuator such that the slider moves toward the OD along the stroke. As the actuator pivots, the head measures the number of cycle counts between the marker zone edge and the ramp. As the lift tab (or some other portion of the HSA) contacts the ramp, the average bias force drops dramatically and detectably and/or the AGC level rises suddenly, locating the ramp relative to the marker zone edge (Step 1104). Alternatively, a sudden change in some other measurable metric known to result from contact between the HSA and the ramp, can indicate the location of the ramp.

Figure 12:
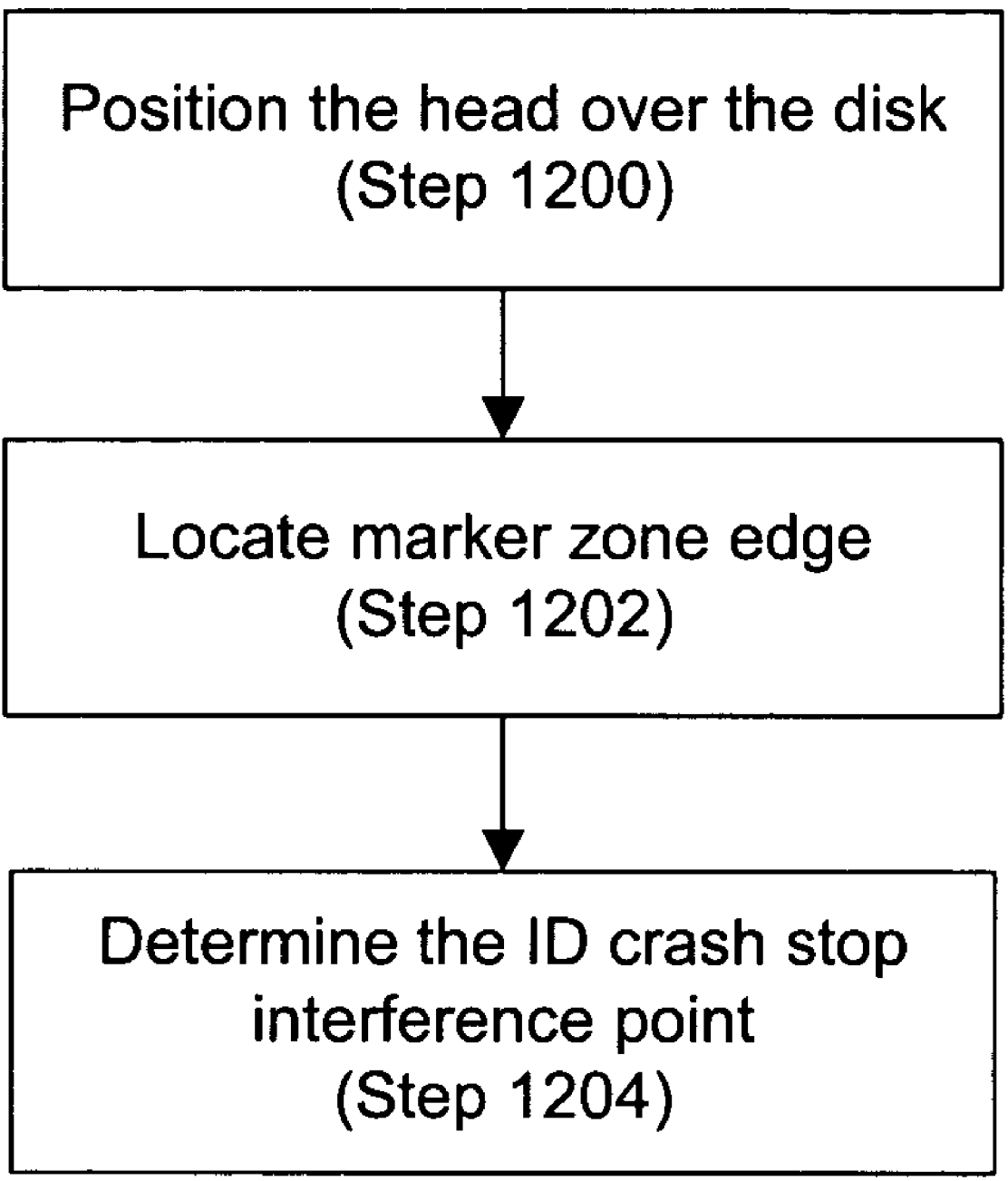
FIG. 12 is a flowchart of a method in accordance with one embodiment of the present invention to determine the position of a crash stop relative to an actuator.

The ID crash stop can be identified in a similar fashion. Referring to the flowchart of FIG. 12, if the HSA is positioned on the ramp, the slider can be positioned over the reference surface of the disk by loading the HSA from the ramp to the disk (Step 1200). Once the slider is positioned over the surface, a radial reference position of one or more of the pattern wedges is located as described above, by detecting a marker zone edge of the template pattern (Step 1202). Once the marker zone edge is located, the position of the ID crash stop can be determined by pivoting the rotary actuator such that the slider moves toward the ID along the stroke. As the actuator pivots, the head measures the number of cycle counts between the marker zone edge and the ID crash stop. As rotary actuator contacts the ID crash stop, the average bias force rises dramatically and detectably, locating the ID crash stop relative to the marker zone edge (Step 1204). Alternatively, a sudden change in some other measurable metric known to result from contact actuator and the ID crash stop can indicate the location of the ID crash stop.

Once the ramp interference point and the ID crash stop interference point have been determined, the mechanical deviation of the ramp and the ID crash stop from a nominal radial position can be calculated. The mechanical deviation of the ID crash stop and the ramp interference point can be used as manufacturing feedback data, and optionally used as failure criteria. In one embodiment, statistical methods are applied to calculate a distribution around a nominal value of radial position for the ID crash stop interference point and ramp interference point. For example, in one embodiment a Gaussian distribution can be calculated and a deviation, e.g. 3 sigma, can be assigned as a failure criteria. Alternatively, a fixed value for a radial position can be assigned as a failure criteria. Assembled hard disk drives that fail one or both of the failure criteria for the ID crash stop and ramp interference points can be binned as lower capacity drives, discarded, or otherwise dispositioned. In other embodiments, a total value of the data stroke is calculated from the ID crash stop and ramp interference points and compared with a failure criteria calculated or determined for the data stroke. Multiple different criteria can be applied to reject hard disk drives having data strokes too small to provide robust performance at the targeted radial density.

Figure 13:
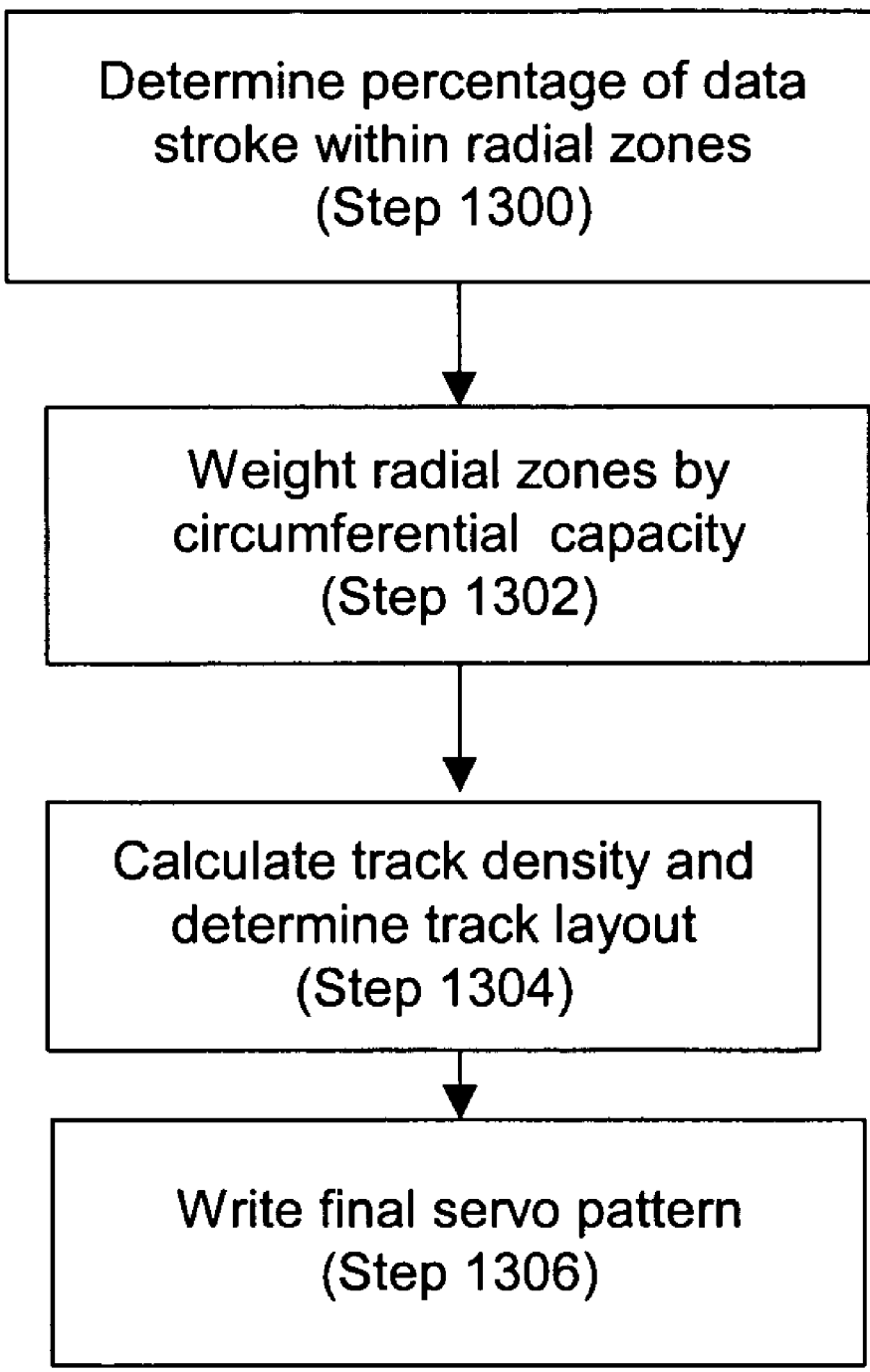
FIG. 13 is a flowchart of a method in accordance with one embodiment of the present invention to calculate a data region for a plurality of disks.

If a hard disk drive falls within acceptable criteria, the radial positions of the ID crash stop and ramp interference points can be used to calculate the available data stroke. Referring to the flowchart of FIG. 13, a percentage of the data stroke within each of the radial zones can be determined based on the radial positions of the interference points (Step 1300). The radial zones can be weighted by the circumferential data capacity of the radial zone relative to the innermost radial zone (Step 1302). The track density can then be calculated (or defined) and a track layout determined based on the required capacity of the hard disk drive or the required track density of the hard disk drive (Step 1304). A final servo pattern can be written to the surface of the disk within the hard disk drive, taking advantage of the width of the data stroke (Step 1306). In one embodiment, the final servo pattern can be written so that a number of data tracks are accurately placed at the appropriate radial locations according to a single read/write format and radial density. This scheme assures accurate data frequency at the various radial data zones. The ID and OD guard-bands can be assured of a minimum width by the failure criteria for the radial positions of the interference points. An increase in the width of the data stroke results in increased guard-band width, resulting in improved servo robustness at the edges of the data region.

In other embodiments, the final servo pattern can be written so that a variable number of data tracks are accurately placed at the appropriate radial locations, again, according to a single read/write format and radial density. This scheme also assures accurate data frequency at the various radial data zones, and a minimum ID and OD guard-width. However, an increase in the width of the data stroke results in an additional number of data tracks, increasing the capacity of the disk. In this way, hard disk drives can be binned and sold according to capacity, or alternatively customized, having only a minimum capacity and a variable maximum capacity.

In still other embodiments, a minimum ID and OD guard width can be assigned, based on a slider width, or some other criteria, and the remaining data stroke is used to write data tracks having a variable radial density to maximize robustness of the written data for a given capacity. The density of the remaining data stroke is determined by the radial width of the remaining data stroke and the relative proportion of the remaining data stroke within the inner and outer radial zones. For example, where a data stroke of a disk in a first hard disk drive is shifted closer to the ID than a data stroke of a disk having the same radial width in a second hard disk drive, the disk from the first hard disk drive will have a higher radial density. This is because the radial positions of the radial zones are fixed; therefore the size of the inner radial zone, having a lower frequency than the outer radial zone, increases when the ID crash stop interference point shifts toward the ID, while the size of the outer radial zone, conversely having a higher frequency than the inner radial zone, increases when the crash stop interference point shifts away from the ID and toward the OD.

Methods in accordance with the present invention can further be applied to self servo write a plurality of disks or a plurality of disk surfaces connected with a spindle motor. Where a plurality of heads are connected with the actuator, a position of the ramps can be determined relative to a marker zone edge by positioning the plurality of heads over the respective disk surfaces, locating the marker zone edge as described above, and pivoting the actuator toward the OD of the plurality of disks surfaces until the actuator contacts at least one of the ramps. A metric—e.g. an average bias force and/or AGC level—is measured by the heads as the actuator pivots until contact between at least one of a plurality of HSAs connected with the actuator and a corresponding ramp is detected. In one embodiment, the plurality of heads are tied together via the head stack and move together on the actuator. The head closest to a corresponding ramp determines the ramp interference point common to all heads. The bias force will change while servoing on any head when the head nearest a corresponding ramp comes into contact. Once the common ramp interference point is determined relative to the marker zone edge, the actuator can be pivoted toward the ID until the actuator contacts the ID crash stop. As described above, the number of cycles between the common ramp interference point and the marker zone edge, and between the marker zone edge and the crash stop interference point can be measured as the head travels across the reference surface. A final servo pattern can be determined and written to the one or more surfaces of the disk(s) as described above.

In some embodiments, multiple surfaces can include printed reference patterns. In such embodiments, a ramp interference point can be determined for each surface and corresponding head by measuring a metric only from the head associated with the target surface. A final track layout can be determined for each of the multiple surfaces, and a final servo pattern can be written to each of the multiple surfaces in accordance with the final track layout. Such embodiments can provide an advantage in optimizing track layout across the entire drive, particularly where the mechanical tolerance between relative head position is large.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

The invention claimed is:

1. A method to bin a rotatable medium having a template pattern in a data storage device, which data storage device including a ramp, a crash stop, and a head connected with an actuator, the method comprising:
    determining a location of a marker zone edge of the template pattern;
    determining a location of the ramp relative to the marker zone edge;
    determining a location of the crash stop relative to the marker zone edge;
    calculating a width of a data stroke based on the location of the ramp and the location of the crash stop; comparing the width of the data stroke to one or more criteria; and binning the rotatable medium for use in an application of the resulting bin based on comparing the width of the data stroke to the one or more criteria.

2. The method of claim 1, wherein determining a location of the ramp relative to the marker zone edge includes:
    positioning the head over the marker zone edge;
    reading the template pattern with the head;
    measuring a metric while reading the template pattern;
    adjusting the actuator such that the head moves toward an outer edge of the rotatable medium;
    detecting a severe change in the metric.

3. The method of claim 1, wherein determining a location of the ramp relative to the marker zone edge includes:
    positioning the head over the marker zone edge;
    reading the template pattern with the head;
    measuring a metric while reading the template pattern;
    adjusting the actuator such that the head moves toward an inner diameter of the rotatable medium;
    detecting a severe change in the metric.

4. The method of claim 2, wherein the metric is a bias force.

5. The method of claim 2, wherein the metric is an AGC level.

6. The method of claim 4, wherein the severe change is a severe drop.

7. The method of claim 5, wherein the severe change is a sharp rise.

8. The method of claim 1, wherein determining a location of the crash stop relative to the marker zone edge includes:
    positioning a head connected with the actuator over the marker zone edge;
    reading the template pattern with the head;
    measuring a metric while reading the template pattern;
    adjusting the actuator such that the head moves toward an inner diameter of the rotatable medium;
    detecting a severe change in the metric.

9. The method of claim 1, wherein determining a location of crash stop relative to the marker zone edge includes:
    positioning a head connected with the actuator over the marker zone edge;
    reading the template pattern with the head;
    measuring a metric while reading the template pattern;
    adjusting the actuator such that the head moves toward an outer edge of the rotatable medium;
    detecting a severe change in the metric.

10. The method of claim 8, wherein the metric is a bias force.

11. The method of claim 10, wherein the severe change is a sharp rise.

12. The method of claim 1, wherein calculating the width based on the location of the ramp and the location of the inner diameter includes:
    determining one or more portions of the data stroke within one or more radial zones;
    weighing the one or more portions by circumferential density; and
    summing the weighted one or more portions.

13. The method of claim 1, wherein the criterion is one of maximum track capacity and minimum track density.

14. A method to write a final servo pattern on a rotatable medium having a template pattern in a data storage device having a ramp, a crash stop, and a read/write head connected with an actuator, comprising:
    determining a location of a marker zone edge of the template pattern;
    determining a location of a ramp relative to the marker zone edge;
    determining a location of a crash stop relative to the marker zone edge; and
    calculating a width of a data stroke based on the location of the ramp and the location of the crash stop; and
    writing the final servo pattern on the rotatable medium based on the width.

15. The method of claim 14, wherein determining a location of a ramp relative to the marker zone edge includes:
    positioning the head over the marker zone edge;
    reading the template pattern with the head;
    measuring a metric while reading the template pattern;
    adjusting the actuator such that the head moves toward an outer edge of the rotatable medium; and
    detecting a severe change in the metric.

16. The method of claim 14, wherein determining a location of a ramp relative to the marker zone edge includes:
    positioning the head over the marker zone edge;
    reading the template pattern with the head;
    measuring a metric while reading the template pattern;
    adjusting the actuator such that the head moves toward an inner diameter of the rotatable medium; and
    detecting a severe change in the metric.

17. The method of claim 15, wherein the metric is a bias force.

18. The method of claim 15, wherein the metric is an AGC level.

19. The method of claim 17, wherein the severe change is a severe drop.

20. The method of claim 17, wherein the severe change is a sharp rise.

21. The method of claim 18, wherein the severe change is a sharp rise.

22. The method of claim 14, wherein determining a location of crash stop ramp relative to the marker zone edge includes:
- positioning a head connected with the actuator over the marker zone edge;
- reading the template pattern with the head;
- measuring a metric while reading the template pattern;
- adjusting the actuator such that the head moves toward an inner diameter of the rotatable medium; and
- detecting a severe change in the metric.

23. The method of claim 14, wherein determining a location of crash stop ramp relative to the marker zone edge includes:
- positioning a head connected with the actuator over the marker zone edge;
- reading the template pattern with the head;
- measuring a metric while reading the template pattern;
- adjusting the actuator such that the head moves toward an outer edge of the rotatable medium; and
- detecting a severe change in the metric.

24. The method of claim 22, wherein the metric is a bias force.

25. The method of claim 24, wherein the severe change is a severe drop.

26. The method of claim 24, wherein the severe change is a sharp rise.

27. The method of claim 14, wherein calculating the width based on the location of the ramp and the location of the inner diameter includes:
- determining one or more portions of the data stroke within one or more radial zones;
- weighing the one or more portions by circumferential density; and
- summing the weighted one or more portions.

28. The method of claim 14, wherein writing the final servo pattern on the rotatable medium based on the width includes:
- selecting a track density;
- selecting a capacity; and
- determining a first user track and a final user track based on the track density and the capacity;
- wherein a distance between the ramp and the first user track is at least a minimum outer guard band and a distance between the crash stop and the final user track is at least a minimum inner guard band.

29. The method of claim 14, wherein writing the final servo pattern on the rotatable medium based on the width includes:
- selecting an outer guard band;
- selecting an inner guard band;
- selecting a capacity; and
- determining a track density based on the capacity, the outer guard band, the inner guard band, and the width.

30. The method of claim 14, wherein writing the final servo pattern on the rotatable medium based on the width includes:
- selecting an outer guard band;
- selecting an inner guard band;
- selecting a track density; and
- determining a capacity based on the track density, the outer guard band, the inner guard band, and the width.

31. The method of claim 14, wherein determining a location of a ramp relative to the marker zone edge includes:
- locating the marker zone edge using the head;
- moving the actuator such that the head moves toward an outer edge of the rotatable medium;
- measuring a plurality of cycles as the head moves from the marker zone edge toward an outer edge of the rotatable medium; and
- determining a position of the ramp by detecting a severe change in the metric.

32. The method of claim 14, wherein determining a location of a crash stop relative to the marker zone edge includes:
- locating the marker zone edge using the head;
- moving the actuator such that the head moves toward an inner diameter of the rotatable medium;
- measuring a plurality of cycles as the head moves from the marker zone edge toward the inner diameter of the rotatable medium; and
- determining a position of the crash stop by detecting a severe change in the metric.

33. The method of claim 31, wherein the metric is a bias force.

34. The method of claim 31, wherein the metric is an AGC level.

35. The method of claim 33, wherein the severe change is a severe drop.

36. The method of claim 33, wherein the severe change is a sharp rise.

37. The method of claim 34, wherein the severe change is a sharp rise.

38. The method of claim 14, wherein the template pattern is one of a media written pattern and a printed media pattern.

39. The method of claim 28, wherein writing the final servo pattern on the rotatable medium based on the width further includes writing a set of tracks from the first user track to the final user track.

40. The method of claim 29, wherein writing the final servo pattern on the rotatable medium based on the width further includes writing a set of tracks from the first user track to the final user track.

41. The method of claim 30, wherein writing the final servo pattern on the rotatable medium based on the width further includes writing a set of tracks from the first user track to the final user track.

* * * * *